Figure 1:
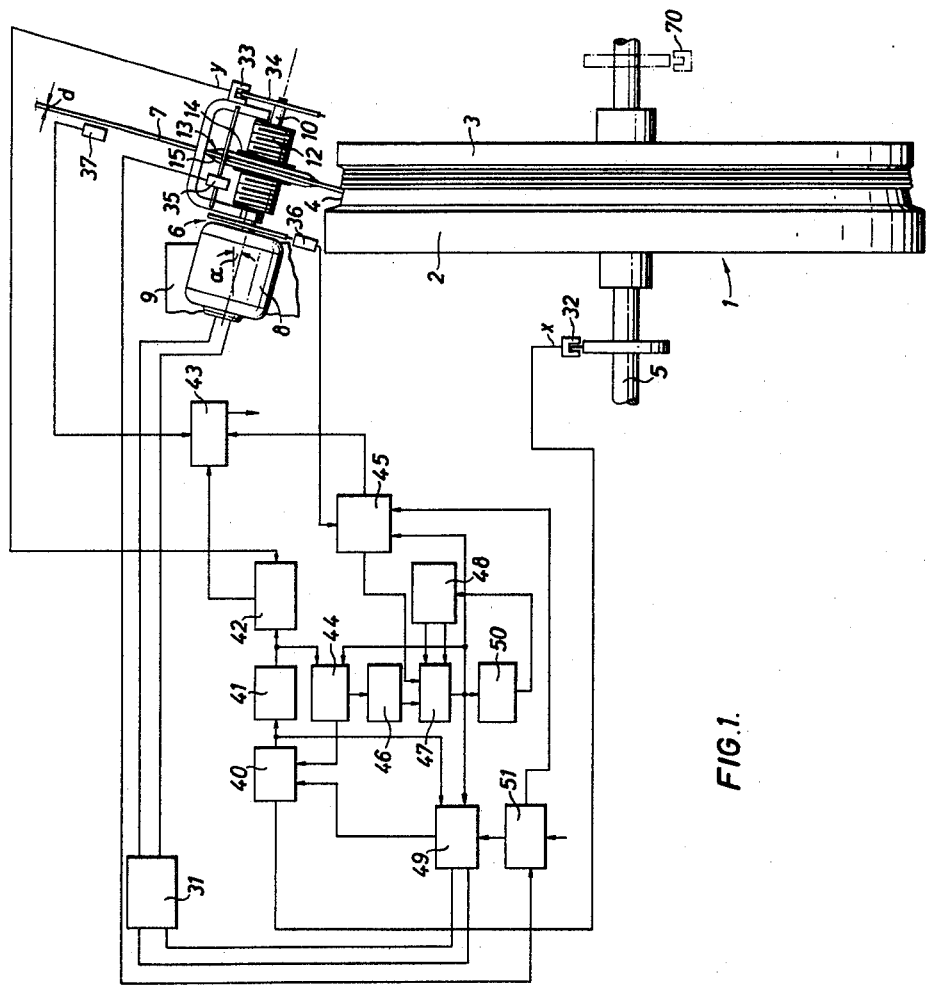

United States Patent
Bell et al.

[11] 3,881,526
[45] May 6, 1975

[54] APPARATUS FOR MANUFACTURING ANNULAR BEADS

[75] Inventors: Robert Graham Bell, Hartlebury, England; James Edward Collins; Gwylfa George Griffiths, both of Swansea, Wales

[73] Assignee: National-Standard Company Limited, Kiddermunster, Worcestershire, England

[22] Filed: June 1, 1971

[21] Appl. No.: 148,429

[30] Foreign Application Priority Data
June 1, 1970 United Kingdom............... 26288/70

[52] U.S. Cl. .............................................. 140/92.2
[51] Int. Cl............................................... B21f 3/04
[58] Field of Search ............ 140/92.2; 245/1.5; 72/5

[56] References Cited
UNITED STATES PATENTS
| | | | |
|---|---|---|---|
| 2,374,652 | 5/1945 | Cohen | 72/5 |
| 3,080,127 | 3/1963 | Porter | 140/92.2 |
| 3,166,104 | 1/1965 | Foley, Jr. et al. | 140/92.2 |
| 3,550,645 | 12/1970 | Keogh | 140/92.2 |

FOREIGN PATENTS OR APPLICATIONS
878,808   10/1961   United Kingdom................ 140/92.2

Primary Examiner—Lowell A. Larson
Attorney, Agent, or Firm—Johnson, Dienner, Emrich, Verbeck & Wagner

[57] ABSTRACT

Apparatus for manufacturing an annular bead, for example a bead for a pneumatic tyre, comprises a rotatable cylindrical former having a circumferential recess therein, guide means for laying a length of wire or strand in the recess circumferentially of the former, means for adjusting the guide means in the axial direction of the former and electronic control means for moving the adjusting means through a predetermined programme of movements to cause the wire or strand to be laid in a predetermined number of superimposed layers each of a predetermined number of turns, whereby a bead of a predetermined cross-sectional shape is formed.

16 Claims, 4 Drawing Figures

APPARATUS FOR MANUFACTURING ANNULAR BEADS

This invention relates to an apparatus for manufacturing and annular bead from a continuous length of filamentary material. In particular, the invention relates to apparatus for manufacturing an annular bead for a pneumatic tyre casing, which bead consists of a plurality of superimposed convolutions of a continuous length of metallic wire or metallic stranded wire which preferably is coated with rubber. For the sake of simplicity in the ensuing description the term "wire" will be used to include both metallic wire and metallic stranded wire material.

The present invention aims to provide apparatus for manufacturing an annular bead comprising a plurality of superimposed convolutions of wire, in which each convolution of wire is laid in a positive location relative to the cross-sectional shape of the bead being manufactured so as to build a bead of predetermined cross-sectional shape.

According to the invention, apparatus for manufacturing an annular bead comprises a rotatable former having a circumferential recess therein, guide means for laying a length of wire in the recess circumferentially of the former, means for adjusting the guide means in the axial direction of the former and electronic control means for moving the adjusting means through a predetermined programme of movements to cause the wire to be laid in a predetermined number of superimposed layers each of a predetermined number of turns, whereby a bead of a predetermined cross-sectional shape is formed.

Preferably, the means for adjusting the guide means comprises a rotatable lead screw, rotation of which causes the guide means to move with at least a component of its movement in the axial direction of the former. If desired, the lead screw may move the guide means via an adjustable proportioning mechanism so that the axial component of the movement of the guide means can be varied for a given rotation of the lead screw.

The lead screw may be arranged to be driven by a stepping electric motor, the electronic control means being arranged to control rotation of the electric motor so that the guide means is stepped in the axial direction of the former through a predetermined distance upon completion of each revolution of the former. In this case, along a short circumferential portion of the finished bead, the wire will have a bent portion in each turn where the guide means is stepped from its position for winding one turn of the wire to its position for winding the next succeeding turn.

In an alternative arrangement, the guide means may be stepped in the axial direction of the former a plurality of times during each revolution of the former.

Preferably, the electronic control means comprises means for detecting breakage of the wire being laid on the former and for resetting the control means to the start position in the event of a wire breakage ocurring.

The former of the apparatus in accordance with the invention may be of conventional construction. However, we prefer to employ a former of the kind described in the specification of British Patent Application No. 11894/70 in order to facilitate removal of the finished bead from the apparatus. If desired, the former may have a plurality of circumferential recesses so that a plurality of beads can be manufactured simultaneously on the same former. In this case a separate guide means would be provided for laying a separate wire into each of the plurality of recesses in the former and the positions of all the guide means would be adjusted simultaneously by a common adjusting means.

Figure 2:
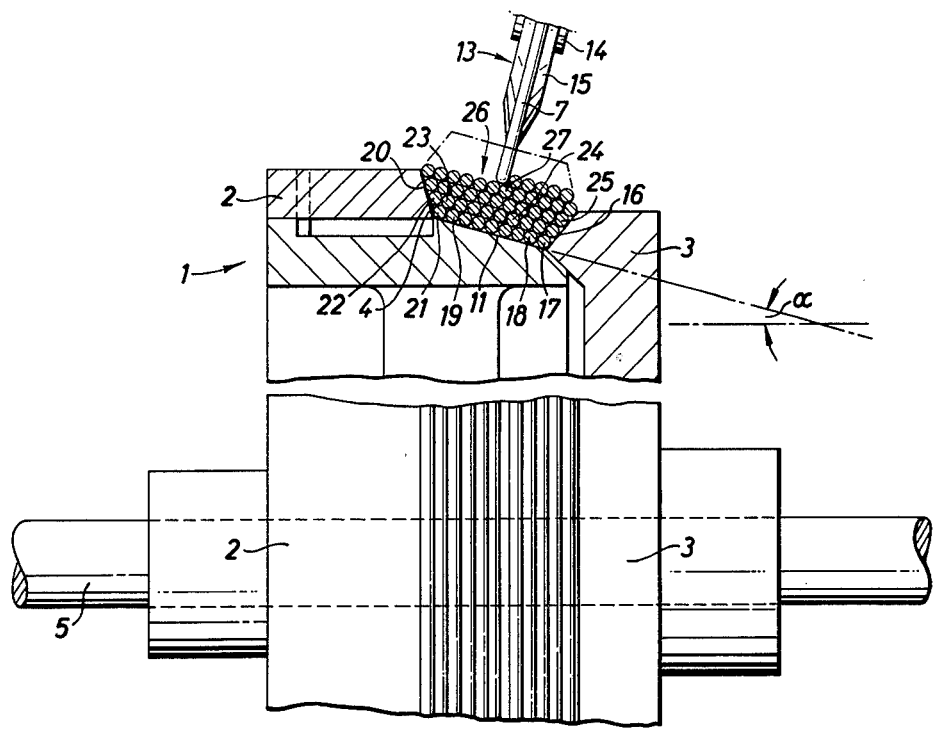
Figure 3:
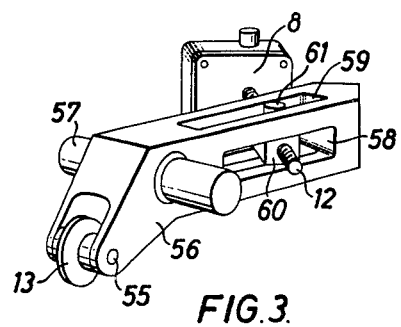
Figure 4:
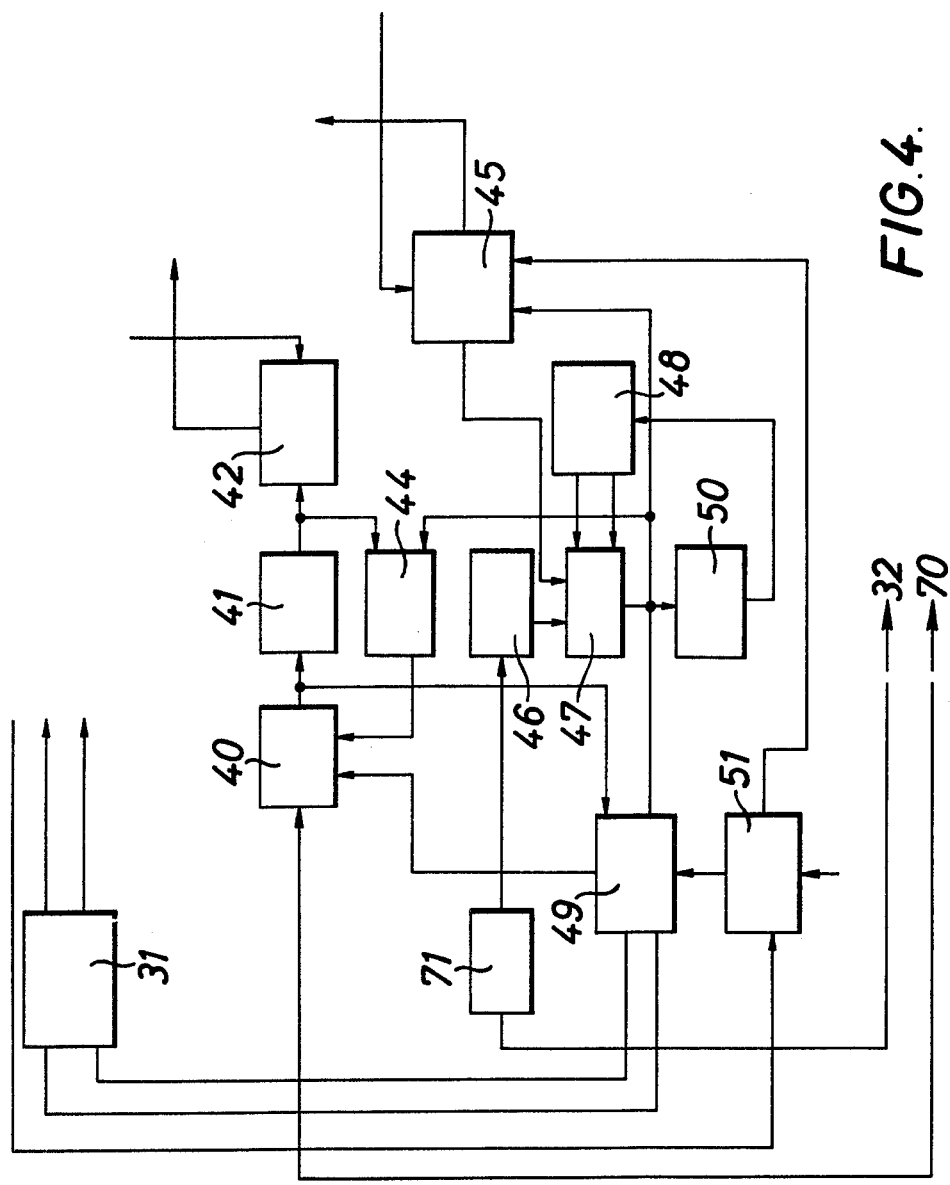

Apparatus in accordance with the invention may be arranged to manufacture bead wires of any desired cross-sectional shape, for example rectangular or hexagonal, and the axis of symmetry of the cross-section may be in the plane of, or inclined to the plane of, the bead. The invention will now be described, by way of example, with reference to the accompanying drawings, in which:

FIG. 1 is a schematic diagram of one embodiment of apparatus in accordance with the invention for manufacturing an annular bead for a pneumatic tyre casing, FIG. 2 is a sectional view, on an enlarged scale, of a detail of the apparatus according to FIG. 1, FIG. 3 is a perspective view of a modified embodiment of part of the apparatus of FIG. 1, and FIG. 4 is a diagram of part of the electronic control means of a further modified embodiment of the apparatus of FIG. 1. Referring to FIGS. 1 and 2, the apparatus illustrated comprises a former generally designated by the reference number 1. This former comprises two axially separable parts 2, 3 as described in the aforesaid co-pending application 11894/70 and has a recess 4 formed around its periphery. In the example shown this recess is intended for the manufacture of a bead of angled hexagonal cross-section. The numeral 5 designates the shaft of the former and this shaft is arranged to be rotated by an electric motor (not shown).

The numeral 6 generally designates a guide means for laying a continuous length of rubber-coated wire 7 in the recess 4. The guide means 6 comprises an electric motor 8 secured to a frame 9 so that the axis of the shaft 10 of the motor lies above the former 1 in a vertical plane in which the axis of the shaft 5, or a line parallel to the axis of shaft 5, lies. The motor 8 is adjustably mounted on the frame 9 so that the axis of the shaft 10 can be disposed parallel to or at an angle to the axis of shaft 5. In the example illustrated, the recess 4 in the former has a frusto-conical bottom surface 11 having an apex angle of 2a in order to form an angled bead. In this case the position of the motor 8 is adjusted on the frame 9 so that the axis of shaft 10 is inclined at angle $\alpha$ to the axis of the shaft 5.

A lead screw 12 is keyed to the shaft 10 and a guide pulley, generally designated by the reference numeral 13, is mounted on the lead screw. The guide pulley 13 comprises a hub 14 which is threadably engaged on the lead screw and a rim 15 which is rotatably mounted on the hub 14 by means of a bearing (not shown).

The apparatus so far described operates in the following manner:

The wire 7, which comes from a suitable supply reel (not shown) has its end secured to the bottom 11 of the recess 4 closely adjacent to the side wall 16 of the recess in any conventional manner, the wire being led around part of the periphery of the pulley rim 15. The shaft 5 is then rotated and a turn 17 of the wire is laid on the bottom 11 of the recess 4 close to the side wall 16. When the turn 17 has been completed the motor 8 is energised to drive the pulley 13 to the left as viewed in FIG. 1 a distance equal to the diameter of the wire 7. Continued rotation of the former then causes a second turn 18 of wire to be laid on the bottom 11 of the recess adjacent to the turn 17. This procedure is repeated until a layer 19 of turns of wire is laid on the bottom 11 of the recess from the side wall 16 to the side wall 20. When the last turn 21 of this layer has been wound, the motor 8 is again energised to move the pulley 13 to the left, as viewed in FIG. 1, a distance equal to half the diameter of the wire 7. Continued rotation of the former 4 then causes the turn 22 to be laid against the side wall 20 of the recess on top of the layer 19. When the turn 22 has been laid, the motor 8 is again energised to move the pulley 13 to the right, as viewed in FIG. 1, a distance equal to the diameter of the wire 7 so that continued rotation of the former 4 causes the turn 23 to be laid. This procedure is repeated until the layer 24 of turns of wire has been completed, whereupon the motor 8 is energised to move the pulley a distance to the right equal to half the diameter of the wire 7 so that continued rotation of the former causes the turn 25 to be laid on top of the layer 24. In the embodiment illustrated, the side wall 16 of the recess is a frusto-conical surface having an apex angle of $120 + 2\alpha$ degrees and the side wall 20 is fursto-conical surface with an apex angle of $120 - 2\alpha$ degrees. By winding layers of wire into the recess 4 in the manner just described, a bead 26 of hexagonal cross-section can be built up on the former. It will be appreciated that the number of turns of wire in each successive layer laid in the recess 4 increases by one up to the layer designated 27. Subsequent layers then have their numbers of turn of wire reduced by one.

In the example illustrated in FIG. 2 the completed bead 26 has seven superimposed layers of turns of the wire 7 and starting from the commencement of the first turn 17, in which the pulley 13 is in its starting position, the pulley has to make the following movements to complete the bead:

a. at the end of each of the first eight complete revolutions of the former 1 the pulley 13 is moved to the left a distance $d$ equal to the diameter of the wire 7 (steps 1-8).

b. at the end of the ninth revolution of the former 1 the pulley 13 is moved to the left a distance equal to 0.5 $d$ (step 9).

c. at the end of each of the tenth to the eighteenth revolutions the pulley is moved to the right a distance equal to $d$ (steps 10-18).

d. at the end of the nineteenth revolution the pulley is moved to the right a distance equal to 0.5 $d$ (step 19), e. at the end of each of the twentieth to the twenty-ninth revolutions the pulley is moved to the left a distance equal to $d$ (steps 20-29).

f. at the end of the thirtieth revolution the pulley is moved to the left a distance equal to 0.5 $d$ (step 30).

g. at the end of each of the thirty-first to the forty-first revolutions the pulley is moved to the right a distance equal to $d$ (steps 31-41).

h. at the end of the forty-second revolution the pulley is moved to the left a distance equal to 0.5 $d$ (step 42).

i. at the end of each of the forty-third to the fifty-second revolutions the pulley is moved to the left a distance equal to $d$ (steps 43-52).

j. at the end of the fifty-third revolution the pulley is moved to the right a distance equal to 0.5 $d$ (steps 53).

k. at the end of each of the fifty-fourth to the sixty-second revolutions the pulley is moved to the right a distance equal to $d$ (steps 54-62).

l. at the end of the sixty-third revolution the pulley is moved to the left a distance equal to 0.5 $d$ (step 63).

m. at the end of each of the sixty-fourth to the seventy-first revolutions the pulley is moved to the left a distance equal to $d$ (*step* d 71).

n. at the end of the seventy-second revolution the bead is completed and the former is stopped.

o. after the wire 7 has been cut and the completed bead 26 removed, the pulley 13 is returned to its starting position in readiness for the winding of the next bead (step 72).

The above seventy-two movments of the pulley 13 are effected by rotation of the lead screw 12 under the control of the motor 8. The latter is a stepping motor which is capable of rotation in either direction and which is supplied with predetermined numbers of current pulses at the commencement of each of the above steps 1-72.

When the wire 7 has been attached to the former 1, the machine operator starts the bead winding operation by energising the motor (not shown) driving the former 1. When the latter has rotated through one revolution it initiates a signal via a proximity switch 32 which will cause the pulley 13 to traverse on pitch, i.e., the distance $d$, using the logic programming mechanism shown in FIG. 1.

The initiating signal from the proximity switch 32 is fed into an oscillator and gate unit 40. The latter feeds pulses into a pitch count unit 41 and into a step direction control unit 49. The pitch count unit 41 will then release a stream of pulses equivalent to the pitch set manually in a set pitch device 44 and the step direction control unit 49 will give a signal to the stepping motor 8 via a step control unit 31, causing the stepping motor to rotate a fixed angular displacement depending on the set pitch. The angular movement of the motor 8 is then transmitted via the screw 12 to cause the pulley 13 to move the set pitch and the former 1 will continue to rotate.

As the bead 26 is built, for each revolution of the former 1 the electronic control will receive an initiating signal from the switch 32 causing the pulley 13 to move one pitch. Each signal arising from the set pitch device 44 will be fed into a turns count unit 46. The turns count unit 46 will decode the number of turns set manually in a set turns device 47. The set turns device 47 is linked with a layer count unit 50, again set manually before the operation of building the bead commences.

The set pitch device 44 has prevision for calling for a half full pitch movement of the pulley 13 at the end of each pre-set number of full pitch movements in each layer. For this purpose the set pitch device 44 is linked with the step direction control unit 49 which determines the direction of traverse of the pulley 13 for each of these half pitch movements. Having pre-determined the number of layers to be built into the bead, layer setting switches 48 are pre-set manually before the bead winding operation starts.

To give continuity to the mechanism,. parity check unit 42 is built into the circuit. The parity check unit 42 receives an input signal via a proximity switch 33 actuated by a pin wheel 34 keyed to the motor shaft 10. The proximity switch 33 sends a pulse to the parity check unit 42 each time one of the pins of the pin wheel passes it. By making the angle between the pins on the pin wheel 34 equal to the stepping angle of the motor 8, the feeding of a given number of stepping pulses to the motor 8 should result in an equal number of pulses being sent by the proximity switch 33 to the parity check unit 42. The parity check unit 42 is linked to a stop former unit 43 which controls the motor driving the shaft 5. If the parity check unit reveals a discrepancy between the number of pulses sent to the stepping motor 8 and the number of pulses transmitted by the proximity switch 33, then a signal is sent to the stop former unit 43 to bring the former 1 to rest. The stop former unit 43 also receives signals from two other sources, namely a. if the wire 7 breaks and a signal is not made through a proximity switch 37, the former 1 will come to rest.

b. at the completion of the bead winding operation, a signal is sent from a re-set count unit 45, and the former 1 comes to rest.

After completion of the bead 26, it is necessary to reposition the pulley 13 to its starting position. This is achieved through a re-set-to-start unit 51 which initiates a given number of pulses to drive the stepping motor 8 in one direction, causing the pulley 31 to initiate a signal via a proximity switch 35. This signal from the proximity switch 35 causes the stepping motor 8 to reverse its direction and drive the pulley 13 through a pre-set number of pitches to its starting position, the final position of the pulley being determined by the proximity switch 33 (acting as a coarse control and proximity switch 36 (acting as a fine control).

In one particular embodiment of the apparatus shown in FIGS. 1 and 2, the former 1 had a diameter of 50 cms, representing a mean circumferential length of the recess 4 of 157 cms. With a feed rate of the wire 7 of 150 metres/min. this necessitated a speed of rotation of the former 1 of one revolution in 0.628 seconds. The completion of each of the full pitch movements of the pulley 13 was arranged to occur in a 7.5 cms. length of the circumference of the recess 4, which corresponded to the time of 30 milliseconds.

The supply to the stepping motor 8 had a frequency of 200 c.p.s., i.e., one pulse every 5 milliseconds. Therefore, in order to complete one full pitch step of the pulley 13, it was necessary to supply six pulses to the motor 8 via the step control unit 31. Since one input pulse to the motor 8 caused the motor to rotate through 7.5°, six pulses caused a rotation of 45°. When using wire 7 having a diameter $d$ of 2 mms. it was therefore necessary for the lead screw 12 to move the pulley 13 through 2 mms. during a 45° rotation of the lead screw. This meant that the lead screw 12 had a thread pitch of 16 mms., assuming a single start thread.

It will be appreciated that the invention is not limited to the particular apparatus described above with reference to FIGS. 1 and 2 of the drawings. Thus, for example, the pulley 13 may be mounted on a slide rod and be driven by the lead screw 12 via simple porportioning mechanism so that the movement of the pulley in the axial direction of the former 1 in response to a given angle of rotation of the lead screw 12 may be varied. FIG. 3 of the drawings shows one way in which this can be done. In this FIG. the pulley 13 is rotatably mounted on a shaft 55 mounted in a frame 56. The frame 56 is slidably mounted on a rod 57, the axis of this rod being parallel to the axis of shaft 55. The frame 56 has a hole 58 of rectangular cross-section passing therethrough, the axis of the hole being parallel to the axis of the rod 57. A second hole 59 of rectangular cross-section passes through the frame 56 with its axis perpendicular to the axis of the hole 58. The lead screw 12 of the stepping motor 8 passes through the hole 58 and engages a nut 60 which is slidably mounted in the hole 58. The nut 60 has oppositely projecting lugs 61 of circular cross-section, only one of which can be seen in FIG. 3. These lugs 61 are a sliding fit in the hole 59. The stepping motor 8 is mounted on a suitable frame (not shown) so that the angle of inclination of the axis of the lead screw 12 to the axis of the rod 57 can be varied from 0° up to any desired value. If the stepping motor 8 is arranged on its frame so that the axis of the lead screw 12 is parallel to the axis of the rod 57, then when the lead screw 12 rotates the pulley 13 will be moved through the same distance as the nut 60. If, on the other hand, the stepping motor 8 is adjusted so that the axis of the lead screw 12 is inclined to the axis of the rod 57, a given movement of the nut 60 results in a smaller movement of the pulley 13. In this way the apparatus can be adapted to wind beads from wires of different diameters.

Again, by adjusting the motor 8 on the frame 9 (FIG. 1), the guide means 6 and its control means may be employed with different formers, for example formers having recesses of different cross-sectional shapes and in which the angle $\alpha$ may be zero.

In the apparatus shown in FIGS. 1 and 2 the motor 8 steps the pulley 13 for a short period during each revolution of the former 1. This means that along a short circumferential portion of the finished bead the wire will have a bent portion each turn where the pulley 13 is stepped from its position for winding one turn to its position for winding the next succeeding turn. If, for any reason, it is preferred to step the pulley 13 in a plurality of steps during which each revolution of the former 1, then the motor 8 is replaced by a similar motor having a gear-box incorporated therein which provides a gear reduction ratio of $r$ between the speed of rotation of the motor armature and the speed of rotation of the motor shaft 10. In addition a pulse generator 70 is mounted on the shaft 5 of the former 1 (as shown in chain lines in FIG. 1), this pulse generator being arranged to generate $r$ pulses during each revolution of the former 1. Finally, th electronic control circuits of the apparatus of FIG. 1 is modified as shown in FIG. 4. In FIG. 4 the same reference numerals have been used as in FIG. 1 to designate the same circuit units. In FIG. 4 the pulses from the pulse generator 70 are fed to the oscillator and gate unit 40 in place of the signals from the proximity switch 32 in the circuit of FIG. 1. The signals from the proximity switch 32 are now fed via a gating unit 71 to the turns count unit 46 and the latter is no longer fed with a signal from the set pitch device 44, as is the case in FIG. 1. In all other respects the circuits of FIGS. 1 and 4 are the same. The result of these modifications is that the motor 8 receives $r$ signal from the step control unit 31 during each revolution of the former 1, so that the lead screw 12 moves the pulley a distance $d/r$ for each signal received by the motor 8. Therefore in one turn of the former 1 the pulley 13 is moved a distance $d$ in $r$ separate steps instead of in a single step as in the case of FIG. 1. The circuit of FIG. 4 controls the number of turns in each layer and the number of layers in response to the signals from the proximity switch 32 in the same way as in the apparatus of FIG. 1.

We claim:

1. Apparatus for manufacturing an annular bead, comprising a cylindrical former having a longitudinal axis, a circumferential recess in the former, means for rotating the former about said axis at a uniform speed, guide means for laying a length of wire in said recess circumferentially of the former, means for adjusting the guide means in the direction of said axis, a stepping electric motor for moving said adjusting means intermittently in the direction of said axis, and electronic control means controlling the supply of electric pulses intermittently to said motor to effect rotation of said motor according to a pre-chosen programme, whereby the adjusting means is moved through a predetermined programme of stepwise movements to cause the wire to be laid in said recess in a predetermined number of superimposed layers each consisting of a predetermined number of turns for the purpose of forming an annular bead of a predetermined cross-sectional shape, said electronic control means comprising a first manually settable unit for determining the number of turns of wire in each of said superimposed layers and a second manually settable unit for determining the number of superimposed layers.

2. Apparatus for manufacturing an annular bead, comprising a cylindrical former having a longitudinal axis, a circumferential recess in the former, means for rotating the former about said axis at a uniform speed, a rotatable lead screw, a guide means threadedly engaged on said lead screw for laying a length of wire in the recess circumferentially of the former, a stepping electric motor drivingly connected with said lead screw for moving the guiding means intermittently with at least a component of its movement in the axial direction of the former, and electronic control means controlling the supply of electric pulses intermittently to said motor to effect rotation of said motor according to a pre-chosen programme, whereby said guide means is moved through a predetermined programme of stepwise movements to cause the wire to be laid in said recess in a predetermined number of superimposed layers each consisting of a predetermined number of turns for the purpose of forming an annular bead of a predetermined cross-sectional shape, said electronic control means comprising a first manually settable unit for determining the number of turns of wire in each of said superimposed layers and a second manually settable unit for determining the number of superimposed layers.

3. Apparatus according to claim 1, in which the electronic control means comprises means for detecting breakage of wire being laid on the former and for resetting the control means to the start position in the event of a wire breakage occurring.

4. Apparatus for manufacturing an annular bead, comprising a cylindrical former having a longitudinal axis, a circumferential recess in the former, means for rotating the former about said axis at a uniform speed, guide means for laying a length of wire in said recess circumferentially of the former, means for adjusting the guide means in the direction of said axis, a stepping electric motor for removing said adjusting means intermittenly stepwise in the direction of said axis, and electronic control means controlling the supply of electric pulses intermittenly to said motor to effect rotation of said motor according to a prechosen programme, said electronic control means comprising means controlling the motor so that the adjusting means is stepped in the direction of said axis through a predetermined distance upon completion of each revolution of the former whereby the adjusting means is moved through a predetermined programme of movements to cause the wire to be laid in said recess in a predetermined number of superimposed layers each consisting of a perdetermined number of turns for the purpose of forming an annular bead of a predetermined cross-sectional shape, said electronic control means further comprising a manually settable unit for determining the number of turns in each of said superimposed layers.

5. Apparatus for manufacturing an annular bead, comprising a former having a longitudinal axis, means on said former defining a recess circumferentially disposed about said axis, means for rotating the former about said axis at a uniform speed, guide means for laying a length of wire in said recess circumferentially of the former, means including a stepping electric motor for adjusting the guide means intermittenly in the direction of said axis, and electronic control means for moving the adjusting means via the stepping electric motor through a predetermined programme of stepwise movements to cause the wire to be laid in a predetermined number of super-imposed layers each of a predetermined number of turns, whereby a bead of a predetermined cross-sectional shape is formed.

6. Apparatus according to claim 5, in which the means for adjusting the guide means comprises a rotatable lead screw, rotation of which causes the guide means to move with at least a component of its movement in the direction of said axis.

7. Apparatus according to claim 6, in which said guide means is mounted in an adjustable proportioning mechanism which is threadedly engaged with said lead screw, said proportioning mechanism serving to vary the axial component of the movement of said guide means for a given rotation of the lead screw.

8. Apparatus according to claim 6, in which said stepping electric motor is drivingly connected with said lead screw, said electronic control means comprising means controlling the rotation of the motor so that the guide means is stepped in the direction of said axis through a predetermined distance upon completion of each revolution of the former.

9. Apparatus according to claim 6, in which said stepping electric motor is drivingly connected with said lead screw via reduction gear means, said electronic control means comprising means controlling rotation of the motor so that the guide means is stepped in the direction of said axis through a predetermined distance a plurality of times during each revolution of the former.

10. Apparatus according to claim 9, in which said reduction gear means provides a speed reduction ratio of $r$ between the speed of the motor and the speed of the lead screw, and in which said means controlling rotation of the motor causes the motor to step the guide means in the direction of said axis $r$ times during each revolution of the former.

11. Apparatus according to claim 5, in which said electronic control means comprises means for detecting breakage of wire being laid on the former and for resetting the control means to the start position in the event of a wire breakage occurring.

12. Apparatus according to claim 5, in which the electronic control means comprises a manually settable unit for determining the number of turns of wire in each of said superimposed layers.

13. Apparatus according to claim 5, in which the electronic control means comprises a further manually settable unit for determining the number of said superimposed layers.

14. Apparatus according to claim 5, in which the electronic control means comprises means for automatically resetting the guide means in position to commence the winding of a new bead.

15. Apparatus according to claim 8, in which the electronic control means is controlled by a signal-generating means driven in synchronism with the former and arranged to deliver a signal to the electronic control means upon completion of each revolution of the former.

16. Apparatus according to claim 10, in which a first signal-generating means driven in synchronism with the former is arranged to deliver $r$ signals to the electronic control means during each revolution of the former for the purpose of effecting stepping movements of said motor, and in which a second signal-generating means driven in synchronism with the former is arranged to deliver a signal to the electronic control means upon completion of each revolution of the former for the purpose of controlling the predetermined programme of movements of said adjusting means.

* * * * *